2,839,506
Patented June 17, 1958

2,839,506

ANTISTATIC TREATMENT FOR HYDROPHOBIC SYNTHETIC FIBER-CONTAINING MATERIALS

Theodore F. Cooke, Martinsville, and Louis J. Moretti, Somerville, N. J., and William J. van Loo, Jr., Rye, N. Y., assignors to American Cyanamid Company, New York, N. Y., a corporation of Maine No Drawing. Application November 16, 1953
Serial No. 392,482

6 Claims. (Cl. 260—67.6)

The present invention relates to curing aminotriazine-aldehyde condensation products with magnesium chloride, particularly in the finishing of textile fabrics, and also to the resulting products.

A wide variety of aminotriazine-aldehyde condensation products have been employed for the treatment of textiles, in order to provide shrink resistance, crease proofing, an improved hand and other desirable qualities. Among these are the methylol melamines such as di- and trimethylol melamines, their alkyl ethers, such as methylated methylol melamines, the guanamines such as acetoguanamine and propioguanamine and similar compounds.

In general, these materials are prepared by the reaction of the selected aminotriazine and an aldehyde. Water-soluble aldehydes are preferred, and especially formaldehyde by reason of its low cost and ready availability. The resins are of an acid-curing nature and a wide variety of acids, acid salts and acid salts of organic amines have been employed as accelerators or curing catalysts, in textile finishing. Aqueous solutions of essentially monomeric aminotriazine-aldehyde condensates mixed with such curing catalysts have been applied to cloth and the resin-impregnated cloth heated to an elevated temperature to cure the resin to a water-insoluble stage. Among the catalysts used were acids such as tartaric, oxalic, acetic, citric, as well as inorganic acid salts such as ammonium sulfate and ammonium chloride. Recently, alkanolamine salts have been favored for use commercially, for example, butanolamine and isopropanolamine hydrochlorides. Although all of these catalysts or accelerators have been used for the same basic purpose, the effects differ greatly. For example, strong acids are excellent catalysts for the polymerization of these condensates but they decompose and weaken cellulosic textile materials. Also aminotriazine resins have tended to hydrophobe in treating baths containing acids or inorganic acid salts after a relatively short period. On the other hand, organic amine salts have not been very efficient accelerators, so relatively large amounts of resin were required to give satisfactory wrinkle recovery.

It has also been proposed in a recent Patent No. 2,653,921 to Sulzer to employ boric acid in combination with a water-soluble salt of a strong acid and a metal of the first or second group of the periodic system as catalysts for aminoplast resins in general and, particularly, urea-formaldehyde resins. This catalyst combination is asserted to change from a weak acidity in dilute solution to a relatively high acidity or low pH in concentrated solution.

An object of the present invention is to provide an improved curing process for the aminotriazine resins.

Another object of the invention is to provide an improved heat-activatable, aminotriazine-aldehyde resin composition.

A further object of the invention is to provide an improved textile finishing process.

Still another object of the invention is to provide an improved aminotriazine resin-treated textile fabric.

An additional object of the invention is to provide a textile resin treating bath of increased stability.

A still further object of the invention is to provide a satisfactory textile finish with a smaller amount of resin.

These and other objects of the invention will be apparent to those skilled in the art upon consideration of the detailed description hereinbelow.

The present invention is concerned with mixtures of aminotriazine-aldehyde condensates with magnesium chloride as the sole essential curing agent and the resulting cured resin.

In a specific application, it relates to the treatment of fibrous materials with an aqueous solution of a water-soluble aminotriazine resin and magnesium chloride followed by a curing operation to provide an improved product. Among the wide variety of suitable fibrous or textile materials are those containing substances having a group reactive with an aminotriazine-aldehyde condensate as exemplified by the hydroxyl groups of viscose rayon. The treatment is especially effective with nitrogen-containing fibers such as linear polyamides, wool and the homo- and copolymers of acrylonitrile with other suitable compounds such as methyl acrylate, the vinyl pyridines, vinyl acetate, vinyl chloride, etc. It also gives greatly improved results with cellulosic materials such as cotton, viscose rayon and cupramonnium rayon. Moreover, the polyester fibers, including cellulose acetate and polyethylene glycol terephthalate, may be treated similarly. In most instances, it is preferable to treat woven, knitted or felted fabrics made up in whole or in part of such fibers but in some applications it is desirable to apply the treatment to unspun loose fibers, rovings, yarns, etc.

The resins suitable for use in the present invention comprise those disclosed in Widmer et al. Patent 2,197,357, including inter alia, melamine, formoguanamine, melam, melem, melon, ammeline, ammelide, acetoguanamine, and propioguanamine condensation products with the various aliphatic, aromatic and heterocyclic aldehydes and aldehyde-yielding substances disclosed therein. The expression "condensation product" is used herein to include not only the condensation products of Widmer et al. but also the alkyl ethers thereof which are obtained by a further treatment with various aliphatic alcohols. A few of these ethers and a method for producing them are set forth in Johnstone et al. Patent Re. 22,566.

The magnesium chloride-aminotriazine resin mixtures have wide utility and are, therefore, suitable for many uses, including paper manufacture, plastic molding, adhesives, laminating various materials, bonding agents, enamels, paints, lacquers, printing inks, leather treating, etc.

Since the present invention is particularly concerned with textile finishing, water-soluble melamine-aldehyde condensates are preferred because these condensates have been used with great success in the textile industry; moreover, melamine is the lowest priced and most readily available of the aminotriazines. In their manufacture the use of formaldehyde is preferred as it yields a water-soluble product and is both economical and readily available. The application of resins to textiles by means of organic solvents introduces problems of solvent recovery, toxic vapors and explosion hazards, and many textile finishing plants are not equipped to handle such problems. Therefore, a water-soluble resin is desirable for wide distribution.

Upon applying aqueous solutions of magnesium chloride and an aminotriazine-aldehyde condensation product, a wide variety of desirable features were noted, especially in connection with textile applications. Treating baths of conventional strength for application of textiles were found to be slightly on the alkaline side and remained so for extended periods running into weeks with only a slight trend towards neutralization as time progressed, whereas those employing conventional accelerators such as ammonium sulfate, organic amine salts, inorganic and organic acids, and boric acid-metal salt combinations had an initial pH below 7 which continued to drop with precipitation of the resin occurring within one day.

It was also found that cloth treated with an aminotriazine resin containing magnesium chloride as the sole curing agent was neutral after curing and hence required no after-wash to protect a cellulosic textile fabric from the detrimental effects of acid. More important, a surprisingly enhanced degree of wrinkle recovery or creaseproofing was obtained together with excellent shrinkage control. While the optimum catalyst-to-resin ratio is somewhat higher than the optimum ratios for prior art catalysts, a distinctly smaller quantity of resin is required in the case of a magnesium chloride-aminotriazine resin mixture than with the prior art catalysts. Magnesium chloride is much cheaper than the aminotriazine resins; therefore treating the textile by the process of the present invention is less expensive than the treatments employing conventional catalysts. Since the resin pick-up according to the treatment of the present invention may be distinctly less than that of the prior art or may be the same, the finisher has a wider variety of hands in his products which he may offer to meet the latest fads in the textile field.

In addition, it has been found that there is considerably less absorption of chlorine when textiles impregnated and cured according to the present invention are exposed to a chlorine bleach followed by a scorching test in accordance with the standard procedure of the A. A. T. C. C. This is evidenced by a great improvement in the tensile strength and a much lower degree of discoloration in that test of the products of the present invention upon comparison with the same cloth processed similarly but using alkanolamine salts as the curing agent. Such effects are completely unexpected as no prior instance is known where a curing agent altered the degree of chlorine retention of an aminotriazine resin.

The action of the curing agent of the present invention is not entirely understood. Equivalent effects are not obtained with other aminoplasts in some respects such as wrinkle recovery. Moreover, salts of other metals and even other salts of magnesium, such as magnesium sulfate, etc., do not produce results of the same order as those obtained in the present curing process.

There is some reason to believe, based on the data set forth in connection with Example VII below, that a chelation reaction occurs between the magnesium chloride and the aminotriazine condensate as evidenced by the fact that substantially all of the magnesium and little of the chlorine of the curing agent is retained by the cured resins. This is thought to be borne out by the fact that the treated textiles of the present invention exhibit less chlorine retention when exposed to chlorine-containing bleach. It is possible that chlorine retention is due to the substitution of chlorine for hydrogen on the amino nitrogens in resins of this type. It may well be that this chlorine substitution is not possible when a magnesium atom is chelated with such nitrogen atoms. This theory is merely offered as a possible explanation for the unexpected results obtained in curing according to the present process; and it is to be understood that since the reactions involved in the present invention are not yet fully known, the present invention is not limited to the above hypothesis.

It has also been found that the present aminotriazine resin compositions have no deleterious effects on the light fastness of a wide variety of dyes, including direct and vat dyes, and, further, that they have the very desirable effect of increasing the wash fastness of direct dyes.

Suitable baths for treating textiles may be prepared by simply mixing the selected aminotriazine-aldehyde condensate either in the form of powdered material or as an aqueous solution with water to the desired concentration at room temperatures along with the proper amount of magnesium chloride in either the anhydrous or hydrated form. In view of its excellent stability, especially at room temperature, it is also contemplated that the mixture of aminotriazine resin and magnesium chloride may be marketed as a concentrated solution in water or any other suitable solvent in order to reduce the formulating problems of the textile finisher.

The aqueous textile treating bath may contain from about 0.5 to about 70% by weight of the aminotriazine-aldehyde condensate depending on the finish desired and the nature of the fabric under treatment. The quantity of magnesium chloride as the sole curing agent calculated as $MgCl_2$ may range from about 1 to about 30% of the dry weight of the aminotriazine-aldehyde condensation product, and for most purposes between about 2 and about 20% are recommended; higher proportions of the salt are preferred for antistatic treatment of hydrophobic synthetic fibers as described hereinafter. Particularly good results have been obtained with 12% of the magnesium chloride salt based on the resin solids.

After the fibrous material has been immersed or "padded through" this treating bath, it is customarily passed through squeeze rolls to remove any excess solution and also to insure uniform impregnation, and then dried and cured. The amount of resin deposited on the fibrous material on a dry basis may range between about 0.5 and about 20% of the weight of untreated material or even more where a very stiff finish is desired; however, a dry pick-up of between 2 and 12% is recommended for most textile finishings operations. The drying may be carried out at temperatures ranging from about 170 to about 250° F. for about 1 to about 30 minutes depending on the drying temperature. Air drying at atmospheric temperatures may also be employed if desired, but this is seldom feasible in a modern textile finishing plant. The curing operation may be conducted using known equipment at temperatures from about 200 to about 500° F. for a period varying inversely with the temperature and ranging between about 2 seconds and about 30 minutes; however, temperatures above 400° F. are seldom used. In general, curing at about 300 to about 360° F. and between about 1 and about 5 minutes is recommended. Where desired the drying and curing steps may be combined in a single operation. In curing the resin may condense with itself in a polymerization reaction or react with the fibrous material or both. In this step the resin is converted into a water-insoluble state which provides the durable effects described herein.

Another aspect of the invention relates to the treatment of static-accumulating hydrophobic synthetic fibers with a mixture of aminotriazine resin and magnesium chloride to prevent the accumulation of static charges thereon. The fibers in this group include nylon, polyesters such as cellulose acetate and polyethylene glycol terephthalate, and acrylonitrile polymers. In this connection the resin-magnesium chloride mixture may be applied to woven or knitted fabrics or to the continuous filament or staple fibers prior to weaving or knitting. For this purpose a larger proportion of magnesium chloride is desirable since it is an active antistatic agent and the resin serves primarily as a bonding agent; thus, mixtures containing 22 to 90% or more $MgCl_2$ based on the dry weight of the resin are contemplated. Upon treating a yarn prepared from a copolymer of 95% acrylonitrile and 5% methyl acrylate according to the process described in Cresswell Patent 2,558,730 to deposit 2% of such a resin-magnesium chloride mixture, it was found that the treated fiber initially possessed a very good antistatic rating and that a considerable proportion of this antistatic effect remained even after a thorough washing with soap and water.

For a better understanding of the nature and objects of this invention, reference should be had to the following examples in which all proportions are given in terms of weight unless otherwise specified. It is to be understood that these examples are intended for purposes of illustration and are not to be construed as limitations on the invention.

Example I

A treating bath is prepared by using 5.5 parts of an 80% solution of methylated trimethylol melamine and 1.1 parts of $MgCl_2.6H_2O$ which are dissolved in 93.4 parts of water at 120° F. A separate comparative bath is prepared similarly except that 1.1 parts of magnesium salt is replaced with 1.1 parts of a 30% solution of mixed isopropanolamines hydrochloride which is the optimum quantity of this catalyst. A separate piece of 80 x 80 bleached unmercerized cotton percale is immersed in each of the above treating baths and passed through squeeze rolls to provide a wet pick-up of about 80% of the solution based on the dry weight of the fabric. The pieces are dried at about 225° F., after which they are heat treated at 350° F. for about 1.5 minutes. After conditioning, the treated fabrics are soaked in a dilute detergent solution containing 0.25% sodium carbonate and 0.25% (Igepon T), thoroughly rinsed in warm water and then dried at 225° F. This washing step is unnecessary in the case of the fabric treated with the $MgCl_2$ curing agent but is included here for comparative processing. Wrinkle recovery tests are then performed using the Monsanto wrinkle test meter and chlorine retention is tested according to the standard A. A. T. C. procedure. Afterwards, samples of the two fibers are submitted to a standard wash (A. A. T. C. C.—1953 Yearbook, p. 140, Std. Test Method 14-53). After drying and conditioning these samples, the wrinkle recovery is tested in the same manner. An untreated piece of cloth is used as a control in both wrinkle tests. The following results are obtained:

| Fabric Treatment | Wrinkle Recovery | |
|---|---|---|
| | Initial | After Wash |
| | Degrees | Degrees |
| Resin+Mg salt | 245 | 232 |
| Resin+Amine salt | 223 | 216 |
| Untreated | 146 | 151 |

In addition, it is found that the tensile strength of the piece treated with the magnesium salt is double that of the piece treated with resin and amine salt after exposure to a chlorine bleach followed by scorching according to the A. A. T. C. test procedure.

Upon repeated washing, it is found that the present aminotriazine compositions containing magnesium chloride lose some of their crease resistance but still retain their initial margin of advantage over aminotriazine resins cured with the conventional amine salts.

Example II

The procedure of Example I is repeated using the same cotton fabric except that one piece dyed with Calcomine Orange R (C.I. 621). Observations are made for bleeding in the pad baths, and for any change in the shade of the treated fabric in comparison with the untreated material. It is found that no bleeding or shade change occurs as a result of the treatment employing the magnesium chloride curing agent. However, when isopropanolamine salt is used as a catalyst, it is observed that both the dye bled in the treating bath and the cured treated fabric is of a much lighter shade than the original dyed fabric.

Examples III–X

Aqueous solutions of methylated trimethylol melamine containing varying proportions of magnesium chloride are applied according to the procedure of Example I to deposit 3.5 percent resin solids based on the weight of the dried cloth and the wrinkle recovery is again tested initially and after one wash using the same apparatus.

In the table of results below, the quantity of curing agent is set forth as percent based on the dry weight of melamine resin and the tensile strength of the fabric is expressed as the total tensile strength found in both the warp and fill directions.

| Example Number | $MgCl_2.6H_2O$ | Total Tensile Strength of Fabric | Wrinkle Recovery | |
|---|---|---|---|---|
| | | | Initial | After Sanforized Wash |
| | Percent | | Degrees | Degrees |
| III | 5 | 65 | 224 | 220 |
| IV | 10 | 68 | 248 | 220 |
| V | 20 | 67 | 238 | 225 |
| VI | 25 | 63 | 252 | 226 |
| VII | 30 | 63 | 234 | 230 |
| VIII | 40 | 59 | 234 | 226 |
| IX | 50 | 57 | 244 | 241 |
| X | 60 | 61 | 251 | 237 |

The treated fabric of Example VII above is analyzed for magnesium and chlorine before and after repeated washings at 160° F. using a 0.5% soap and 0.1% soda ash solution with the following results:

| | Mg | Cl |
|---|---|---|
| | Percent | Percent |
| Theoretical | 0.13 | 0.38 |
| Initial | 0.16 | 0.04 |
| After 1st wash | 0.11 | 0.0035 |
| After 2nd wash | 0.12 | 0.0035 |
| After 3rd wash | 0.13 | 0.0035 |

Example XI

| | Percent |
|---|---|
| Methylated trimethylol melamine | 69.5 |
| $MgCl_2.6H_2O$ | 8.7 |
| Water | 21.8 |

A uniform solution of the above composition is prepared by mixing solutions of the two solids. The initial pH is found to be 7.8 and the pH of a sample diluted with water to a concentration of 5% resin solids (a typical textile treating bath concentration) is 7.3. After standing for three weeks at 20–25° C., the pH of the concentrated solution is 7.5 and upon dilution to 5% resin and standing for 6 hours is 7.3. At no time is a gel, precipitate, haze or discoloration observed in the initial and final concentrated and dilute solutions.

Example XII

| | Percent |
|---|---|
| Methylated trimethylol melamine | 61.5 |
| $MgCl_26H_2O$ | 15.3 |
| Water | 23.2 |

Example XI is repeated over a 3-week period using the altered composition immediately above with the same observed results. The pH of the concentrated solution changes only from 7.5 to 7.3 which is the pH of the final dilute sample.

Example XIII

| | Percent |
|---|---|
| Methylated trimethylol melamine | 50 |
| $MgCl_2.6H_2O$ | 25 |
| Water | 25 |

Example XI is repeated using the formulation immediately above for a storage period of one week with the same observed results. Initial and final samples both dilute and concentrated are found to have the same pH value of 7.3.

In addition, it appears that the present compositions are equal in all respects and superior in some in controlling the shrinkage of various fabrics.

*Example XIV*

Rayon gabardine is treated under similar conditions with optimum amounts of magnesium chloride and mixed isopropanolamines hydrochloride as curing agents for 5% methylated trimethylol melamine, and is found that the shrinkage of rayon gabardine after three (3) rayon washes amounts to only 4% for the piece treated with the resin containing magnesium chloride as compared with 8% shrinkage for the piece treated with amine salt catalyst.

*Example XV*

An aqueous bath is prepared containing 1.1% by weight of $MgCl_2.6H_2O$ and 4.7% amorphous, essential monomeric, dimethylol melamine. 80 x 80 cotton percale is padded through this bath with the squeeze rolls adjusted to provide a dry pick-up of 3.5% melamine resin solids based on the dry untreated fabric weight; then the impregnated fabric is dried and cured for 1.5 minutes at 350° F. No process wash is required. After conditioning, the treated fabric is found to have a high crease-resistance.

*Example XVI*

Nylon net is padded through an aqueous solution of 40% by weight of methylated trimethylol melamine and 10% $MgCl_2.6H_2O$. The wet pick-up is 50%, hence the dry pick-up is 20% by weight of dry melamine resin. Upon curing at 250° F. for 4.5 minutes, a durable stiff finish is obtained.

We claim:

1. A process which comprises impregnating a textile material containing hydrophobic synthetic fibers, normally subject to the accumulation of static electricity selected from the group consisting of nylon, cellulose acetate, polyethylene glycol terephthalate, and acrylonitrile polymers, with an aqueous solution of a curable, water-soluble melamine-formaldehyde condensation product, said aqueous solution containing from between 22 and about 90%, based on the dry weight of the resin, of a curing catalyst consisting of magnesium chloride, in sufficient quantity to deposit from 0.5 to 20% resin solids, based on the weight of the dry textile material, and curing the impregnated material at a temperature between about 200 and 400° F. for a period sufficient to convert the resin to the water-insoluble state, whereby the accumulation of static electricity on the textile material is minimized.

2. A process according to claim 1 in which the textile material comprises fibers containing an acrylonitrile polymer and in which substantially 2% of the resin-magnesium chloride mixture is deposited, based on the weight of the dry textile material.

3. A process according to claim 1 in which the textile material comprises fibers containing nylon.

4. A process according to claim 1 in which the textile material comprises fibers containing cellulose acetate.

5. A heat-activatable antistatic composition for use on textile materials that contain hydrophobic synthetic fibers that are normally subject to the accumulation of static electricity selected from the group consisting of nylon, cellulose acetate, polyethylene glycol terephthalate, and acrylonitrile polymers, which consists of a water-soluble, curable melamine-formaldehyde condensation product, and between 22 and about 90%, based on the dry weight of the resin, of a curing agent consisting of magnesium chloride.

6. A process according to claim 1 in which the textile material comprises fibers containing polyethylene glycol terephthalate.

References Cited in the file of this patent

UNITED STATES PATENTS

| | | |
|---|---|---|
| 2,504,857 | MacIntyre | Apr. 18, 1950 |
| 2,653,921 | Sulzer | Sept. 29, 1953 |

FOREIGN PATENTS

| | | |
|---|---|---|
| 278,698 | Great Britain | Dec. 27, 1928 |
| 822,349 | France | Sept. 13, 1937 |